(12) United States Patent
Coombe et al.

(10) Patent No.: US 12,098,628 B2
(45) Date of Patent: Sep. 24, 2024

(54) SAND QUANTIFICATION SKID

(71) Applicant: ENERCORP SAND SOLUTIONS INC., Calgary (CA)

(72) Inventors: Brent James William Coombe, Calgary (CA); Ryan Thomas Bowley, Calgary (CA)

(73) Assignee: ENERCORP SAND SOLUTIONS INC., Calgary (CA)

( * ) Notice: Subject to any disclaimer, the term of this patent is extended or adjusted under 35 U.S.C. 154(b) by 539 days.

(21) Appl. No.: 17/086,568

(22) Filed: Nov. 2, 2020

(65) Prior Publication Data

US 2021/0131256 A1    May 6, 2021

Related U.S. Application Data

(60) Provisional application No. 62/930,175, filed on Nov. 4, 2019.

(51) Int. Cl.
*E21B 43/34* (2006.01)
*B01D 29/60* (2006.01)
*E21B 43/267* (2006.01)
*G01G 17/04* (2006.01)
*G01G 23/01* (2006.01)

(52) U.S. Cl.
CPC .............. *E21B 43/35* (2020.05); *B01D 29/60* (2013.01); *G01G 17/04* (2013.01); *G01G 23/01* (2013.01); *E21B 43/267* (2013.01)

(58) Field of Classification Search
CPC .............................. B01D 29/35; E21B 21/065
See application file for complete search history.

(56) References Cited

U.S. PATENT DOCUMENTS

| | | | | |
|---|---|---|---|---|
| 4,373,276 | A | * 2/1983 | Schnell ................... | E02F 3/905 285/302 |
| 2004/0112822 | A1 | * 6/2004 | Saik ....................... | B01D 29/23 210/241 |
| 2015/0082858 | A1 | * 3/2015 | Zhao ...................... | G01G 21/26 73/1.15 |
| 2016/0130095 | A1 | * 5/2016 | Oren ...................... | B65D 88/28 220/23.91 |
| 2018/0065814 | A1 | * 3/2018 | Eiden, III ............. | B65D 88/32 |
| 2018/0093823 | A1 | * 4/2018 | Hess .................... | B65D 90/587 |
| 2019/0084468 | A1 | * 3/2019 | Teichrob ................. | B60P 3/226 |
| 2020/0141220 | A1 | * 5/2020 | Loranger ............. | B01D 21/262 |
| 2021/0252431 | A1 | * 8/2021 | Malone .................. | B01D 21/34 |
| 2021/0331843 | A1 | * 10/2021 | Vollrath ................. | B65B 3/003 |

* cited by examiner

*Primary Examiner* — Jonathan M Peo
(74) *Attorney, Agent, or Firm* — MH2 TECHNOLOGY LAW GROUP, LLP (57) ABSTRACT

A sand quantification system includes a box configured to be positioned over a tank. The box includes an openable bottom configured, such that, when the bottom is open, contents within the box are dumped into the tank. The box also includes a filter configured to allow liquid to drain out of the box without opening the bottom. The system also includes a load cell configured to measure a weight of the box and the contents therein without measuring a weight of the tank.

25 Claims, 13 Drawing Sheets

SAND QUANTIFICATION SKID

CROSS-REFERENCE TO RELATED APPLICATIONS

This application claims priority to U.S. Provisional Patent Application having Ser. No. 62/930,175, which was filed on Nov. 4, 2019 and is incorporated by reference herein in its entirety.

BACKGROUND

Hydraulic fracturing is a well-treatment process in which preferential flowpaths for hydrocarbons are established in a subterranean rock formation by pumping a fluid at high pressures into a well to initiate fractures in the rock formation. The fluid is predominately water, but may also include solids, such as sand or ceramic proppants, which at least partially fill the fractures and maintain the preferential flowpaths.

When oil or other fluids are produced/recovered from the well, it may be desirable to remove sand or other solids from the produced fluid. Typically, a separator system is used, which may include one or more separation devices (e.g., cyclonic separators), filters, screens, tanks, etc. The separator system is generally connected to a wellhead via pipes or tubing. The fluid thus flows from well, into the wellhead, and then to the separator system, where the solids are separated out. The solids may be stored in a tank and periodically removed, while the fluids may be further separated (e.g., to separate hydrocarbons from water), Recovered hydrocarbons may be stored or otherwise transported for sale, and recovered water may be stored or otherwise recirculated for use in the well.

In some cases, it may be desirable to know the amount of sand separated from the fluid in the separator, and/or the rate at which such separation occurs. In order to do this, the sand from the separator may be run through a "sock", which may catch the sand while allowing the liquid to flow through, prior to reaching an open-air tank. The sock is then weighed, which reveals the amount of sand collected therein. However, such a manual process exposes operations to worker-related delays, and calls for the sock to be removed and weighed after each blowdown, which can be time and labor intensive.

SUMMARY

Embodiments of the disclosure include a sand quantification system. The sand quantification system includes a box configured to be positioned over a tank. The box includes an openable bottom configured such that, when the bottom is open, contents within the box are dumped into the tank, and a filter configured to allow liquid to drain out of the box without opening the bottom. The system also includes a load cell configured to measure a weight of the box and the contents therein without measuring a weight of the tank.

Embodiments of the disclosure also include a method including blowing down a sand separator. Blowing down the sand separator produces a slurry comprising a solid and a liquid. The method also includes receiving the slurry into a box positioned over a tank, measuring a weight of the box, based on the weight of the box, determining an amount of sand received from the sand separator by blowing down the sand separator, and adjusting a blowdown frequency for the sand separator based on the amount of sand.

Embodiments of the disclosure further include a sand quantification system including an open-air tank, a gantry support comprising uprights and a central support extending between the uprights and across the open-air tank, an inlet conduit coupled to the gantry support and configured to receive a slurry, and a box suspended from the central support, the box being in fluid communication with the inlet conduit. The box includes one or more filters, an actuator, and a bottom that is openeable by operation of the actuator. The system also includes a load cell coupled to the box and the central support, the load cell being configured to measure a weight of the box.

BRIEF DESCRIPTION OF THE DRAWINGS

The present disclosure may best be understood by referring to the following description and the accompanying drawings that are used to illustrate embodiments of the invention. In the drawings.

DETAILED DESCRIPTION

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

Embodiments of the present disclosure may include a sand quantification system for use in a sand separation system. The sand quantification system is configured to measure one or more characteristics of sand produced from a well or another source. For example, the sand quantification system may permit accurate measurement of the weight of the sand produced, the rate at which it is produced, the composition of the slurry in which the sand is suspended, or other characteristics. The system may be "automated" in the sense that it may take measurements and/or take one or more actions without direct human intervention. For example, the system may automatically determine when to empty a box that collects the sand, may signal to a processor that a collection tank is full (and thus not ready to accept additional sand), or the like.

Figure 1:
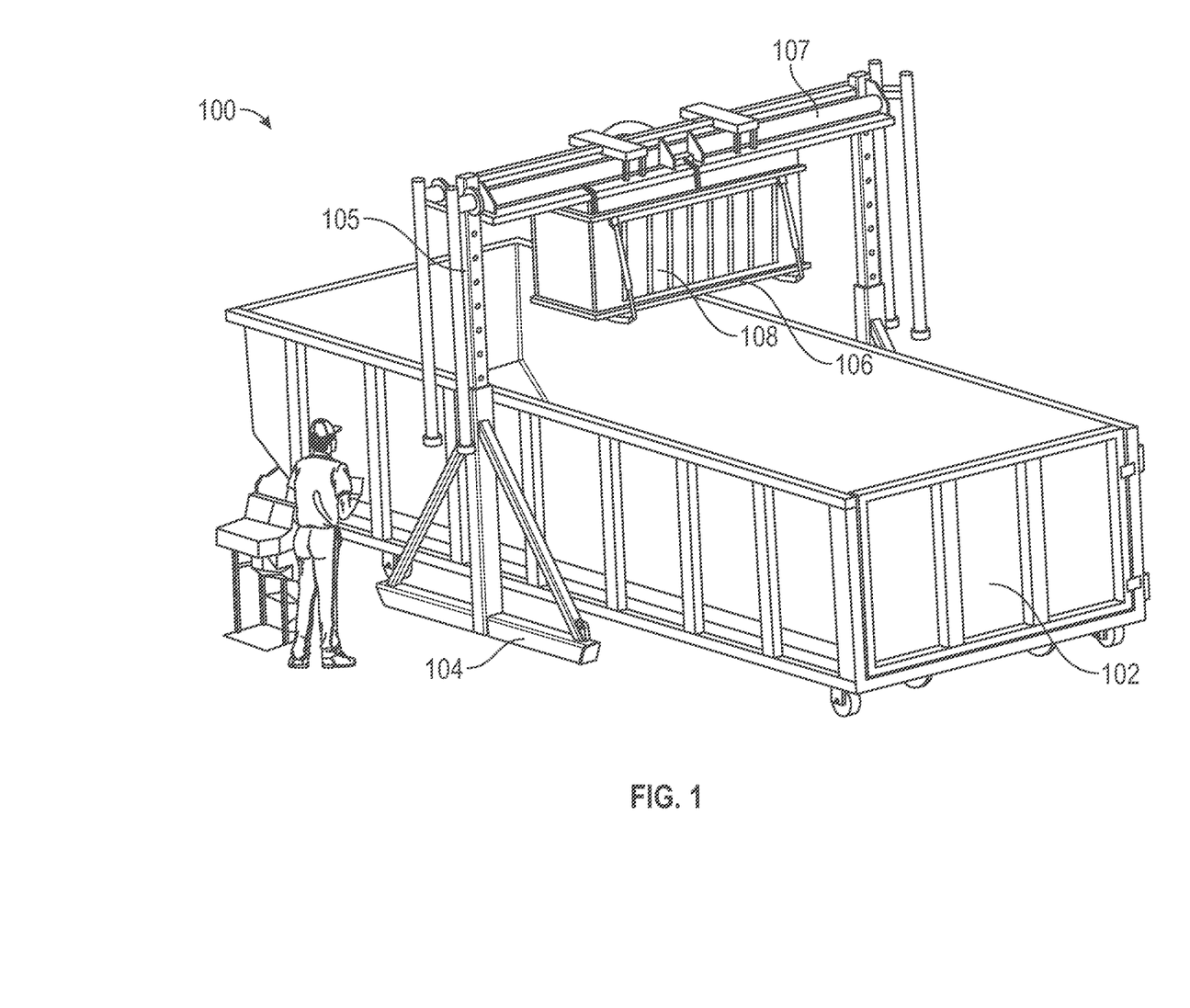
FIG. 1 illustrates a raised perspective view of a sand quantification system, according to an embodiment.

FIG. 1 illustrates a perspective view of a sand quantification system 100, with an open-air tank 102 received therethrough, according to an embodiment. The sand quantification system 100 may generally include a support base 104 (e.g., also referred to herein as a "gantry support") having two uprights 105 and a central support 107 extending therebetween. A box 106 may be connected to the central support 107, and may thus be suspended over the tank 102. The uprights 105 may be adjustable so as to permit adjustment to the height of the box 106 over the tank 102. Although the box 106 is shown and described herein as a cuboid, it will be appreciated that the box 106 may be cylindrical, spherical, or any other suitable shape.

A sand-slurry delivery assembly, including pipes, valves, conduits, etc., may provide a liquid/sand slurry to the box 106, e.g., from blowdown of a sand separator that receives fluid produced from a well. The box 106, in turn, includes sides, at least one of which may be provided with a filter 108. A bottom of the box 106 may be openable, as will be described in greater detail below, to permit emptying of the box 106 into the tank 102. In operation, as the sand slurry is delivered into the box 106, the liquid flows through the filters 108, while the sand is caught in the box 106 and prevented from flowing through the filters 108. Periodically, the bottom of the box 106 may open and dump sand into the tank 102.

Figure 2A:
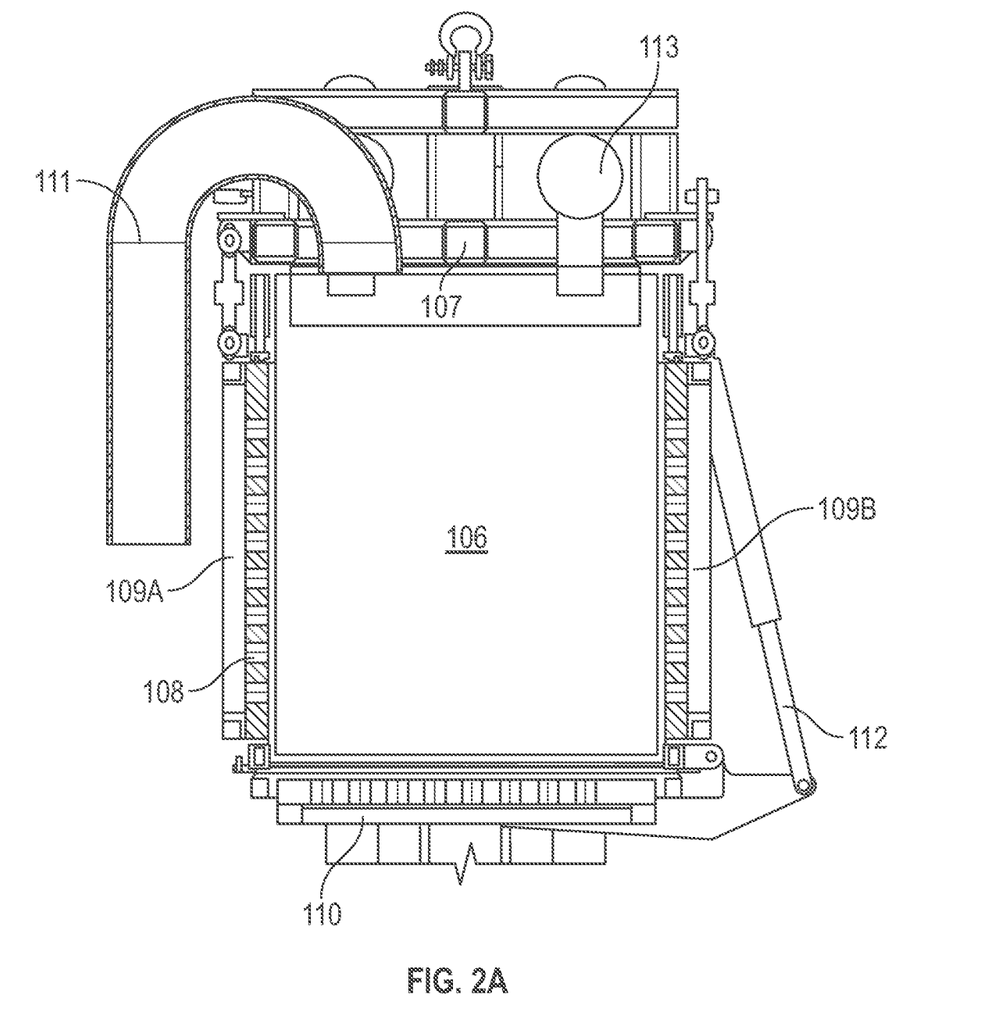
FIG. 2A illustrates a side, cross-sectional view of a box of the sand quantification system, according to an embodiment.

FIG. 2A illustrates a side, cross-sectional view of the box 106, according to an embodiment. As mentioned above, the box 106 is provided with filters 108, e.g., in sides 109A, 109B of the box 106 and/or in an openable bottom 110 thereof. In addition, the box 106 may include a vent 111, which may communicate with an interior of the box 106 and may extend in a generally J-shape, over one of the sides 109A, 109B, to prevent overfilling the box 106. A slurry of sand (and/or other solids) and liquids may be received into the box 106 via one or more inlet conduits 113 that extend along at least a portion of the central support 107. The conduits 113 may deposit the slurry through the top of the box 106. The vent 111 may be configured to allow gas to escape when the slurry is fed into the box 106 and/or to allow the slurry to overflow.

The box 106 may also include an actuator 112, such as an extendable hydraulic or pneumatic cylinder. The actuator 112 may be linked to the bottom 110, and may be operable to open and close the bottom 110, such that, when the bottom 110 is open, the contents of the box 106 may be released into the tank 102 (FIG. 1) below.

Figure 2B:
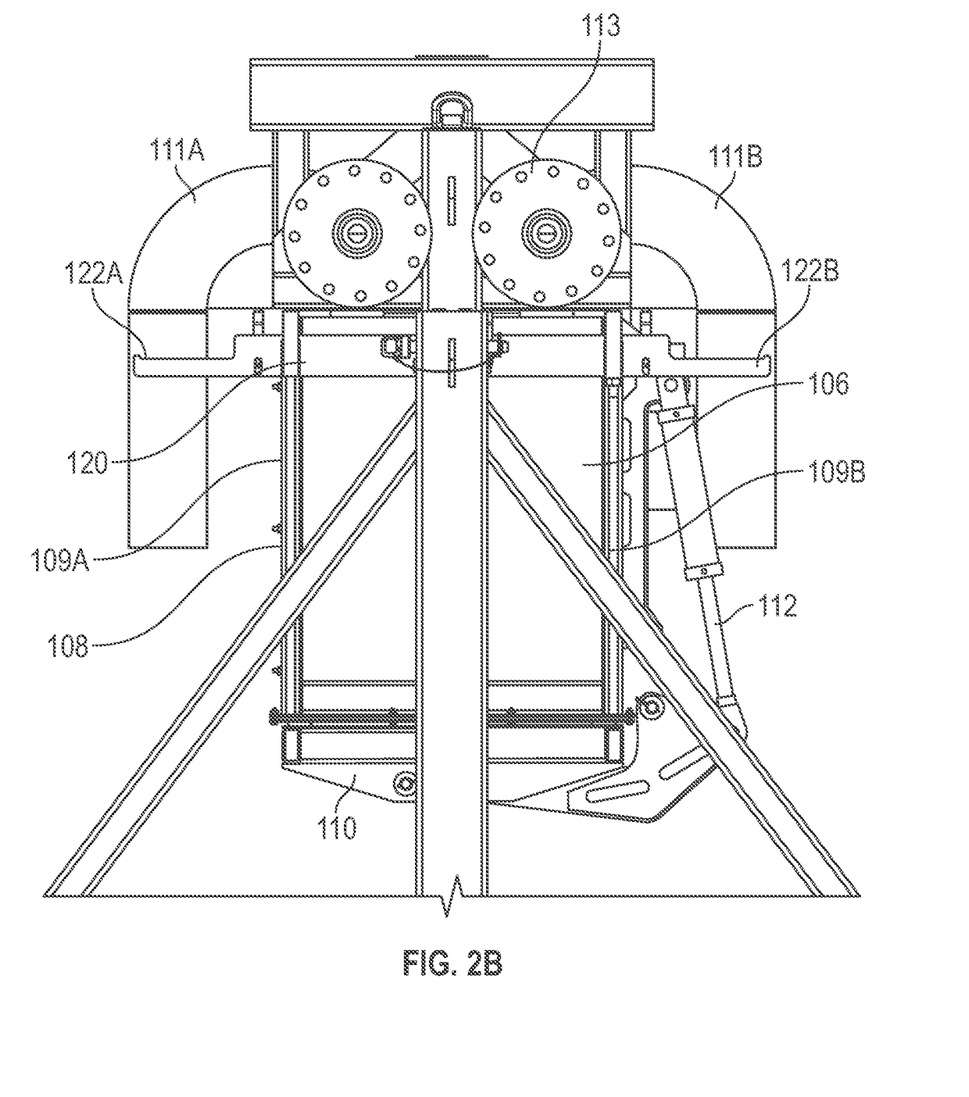
FIG. 2B illustrates a side, cross-sectional view of another embodiment of the box of the sand quantification system.

FIG. 2B illustrates a side view of another embodiment of the box 106. In this embodiment, two vents 111A, 111B are provided, extending over and down along opposing sides 109A, 109B. In addition, the box 106 may include a calibration hanger assembly 120. As shown, the calibration hanger assembly 120 may include two or more hangers 122A, 122B, from which weights may be suspended. The provision of hangers 122A, 122B may permit calibration of weight sensors (as will be described in greater detail below) in the box 106, without requiring a user to lean over or enter the tank 102, which may be prohibited by regulation or by circumstance of potentially hazardous material being contained in the tank 102. The calibration hanger assembly 120 will be described in greater detail below.

Figure 3A:
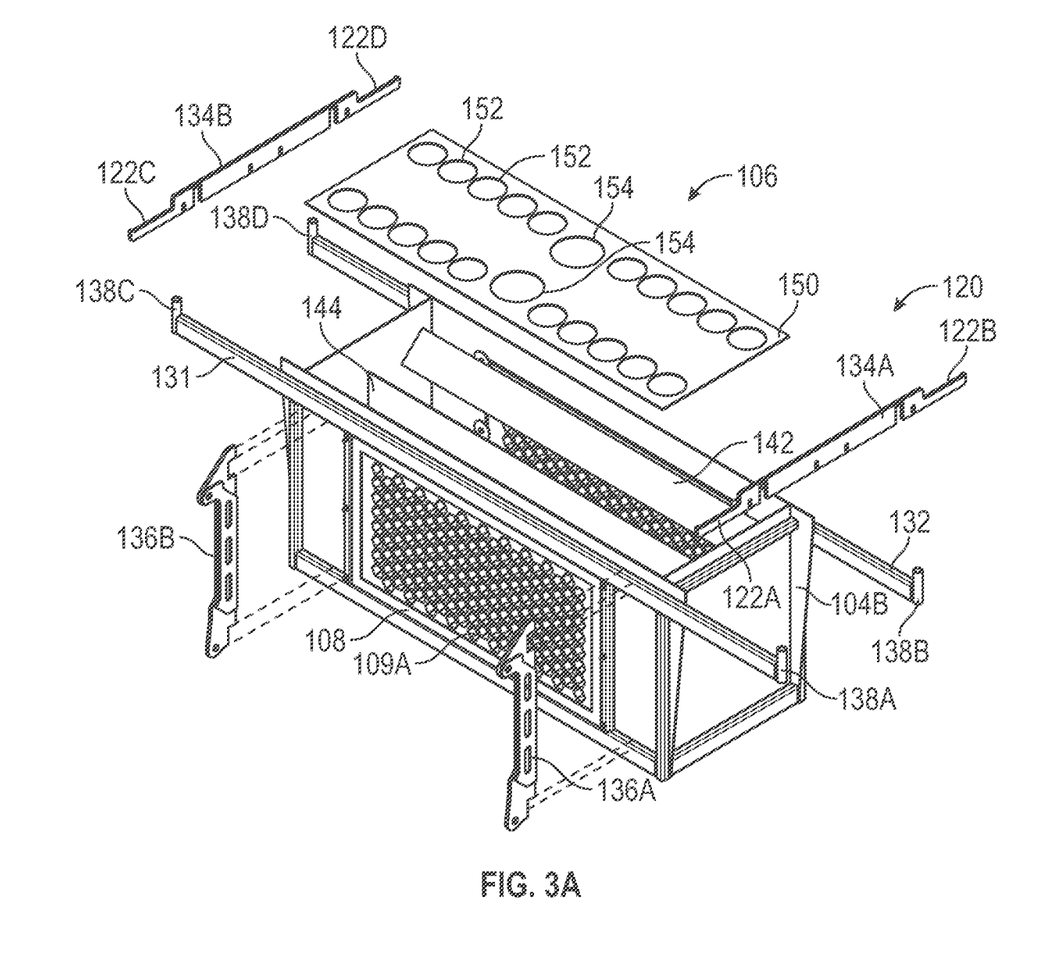
FIG. 3A illustrates an exploded view of the box of the sand quantification system, according to an embodiment.

FIG. 3A illustrates a perspective, exploded view of the box 106, according to an embodiment. As discussed above, the box 106 has sides 109A, 109B, in which filters (e.g., mesh screens) 108 are provided. Further, the box 106 includes the hanger assembly 120, including the hangers 122A, 122B discussed above. As shown, the opposite end of the box 106 includes similar hangers 122C, 122D, which may also be part of the hanger assembly 120. Additionally, pairs of hangers 122A, 122C and 122B, 122D are connected together by cross-members 131, 132. Specifically, the cross-members 131, 132 are connected to brackets 134A, 134B that provide the hangers 122A-D. Further, the cross-members 131, 132 are connected to the box 106 via vertical brackets 136A, 136B.

The cross-members 131, 132 may each additionally include hangers 138A, 138B, 138C, 138D at or proximal to opposing ends thereof. The cross-members 131, 132 may position the hangers 138A-D outward, away from the rest of the box 106, and past the uprights 105 (FIG. 1), so as to more easily permit addition or removal of calibration weights.

Figure 3B:
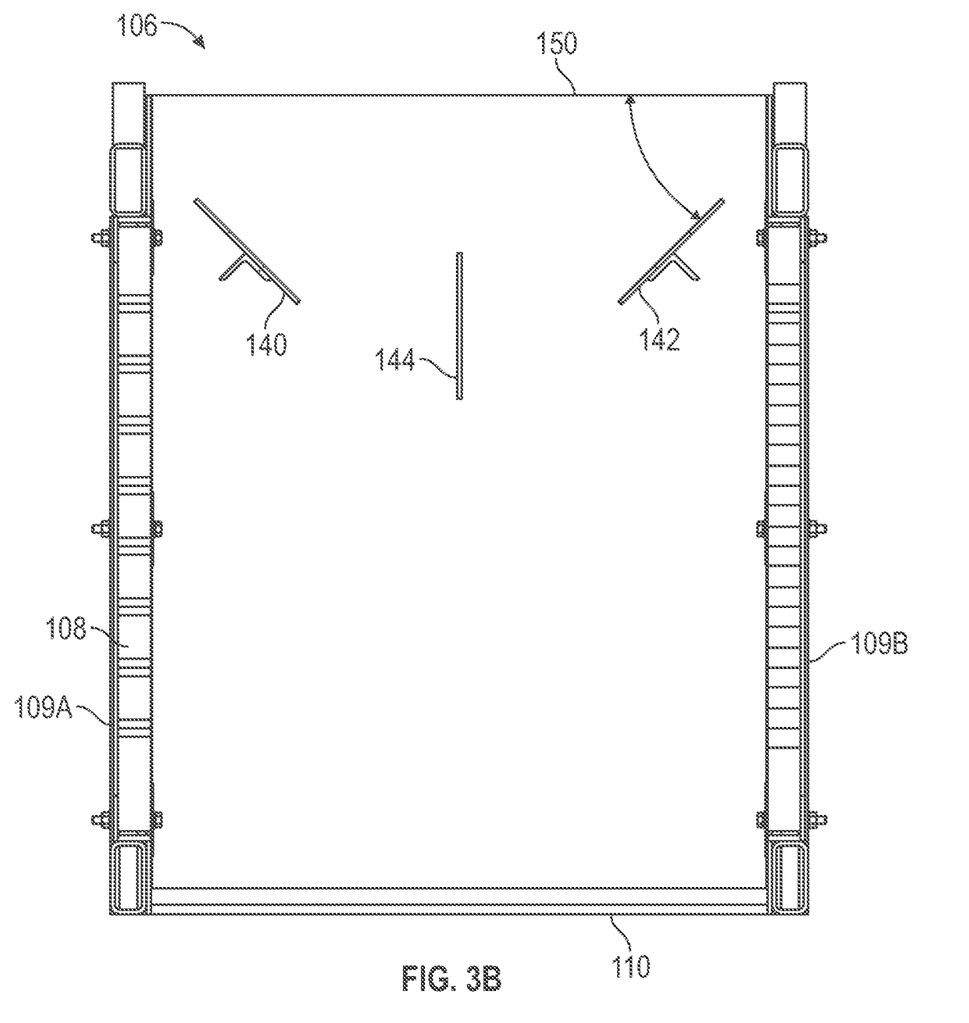
FIG. 3B illustrates another cross-sectional view of the box, showing internal baffles therein, according to an embodiment.

With additional reference to FIG. 3B, the interior of the box 106 may include baffles 140, 142, 144, which may extend parallel to the sides 109A, 109B. The baffles 140, 142 may be angled, e.g., at between about 10 degrees, about 20 degrees, about 30 degrees and 60 degrees, 70 degrees, or 80 degrees to horizontal. For example, the baffles 140, 142 may be oriented at about 45 degrees to horizontal, e.g., in opposite directions, so as to direct sand received through the top away from the sides 109A, 109B and toward a middle of the box 106. The baffle 144 may extend generally vertically and may be positioned laterally between the baffles 140, 142. The baffles 140-144 may be positioned in the box 106 to prevent the slurry of sand and fluid received therein from eroding the sides 109A, 109B and/or bottom of the box 106. Specifically, the baffles 140, 142 may be positioned beneath the location where the slurry is fed to the box 106, and may thus impede the slurry, preventing it from directly impinging against the bottom 110 and/or the sides 109A, 109B of the box 106. The baffle 144 may serve to impede the progress of the slurry and/or to direct the slurry downwards. Further, the baffles 140-144 may be positioned at a distance from the bottom 110 of the box 106 sufficient to avoid the baffles 140-144 being submerged within the slurry contained therein.

A top plate 150 may be positioned on the top of the sides 109A, 109B and extend over the top of the box 106. The top plate 150 may include a series of holes 152 formed therein, as shown. The holes 152 may be sized and positioned to receive inlet pipes therethrough, so as to provide communication from the inlet conduit 113 to the interior of the box 106, while preventing the slurry from splashing out of the box 106. The holes 152 may further be sized and positioned so as to not seal with the inlet pipes. Additionally holes 154 may be formed in the top plate 150, which may be sized and positioned to receive the vents 111A, 111B therethrough, again, potentially providing clearance between and thus not sealing with the vents 111A, 111B.

Figure 4:
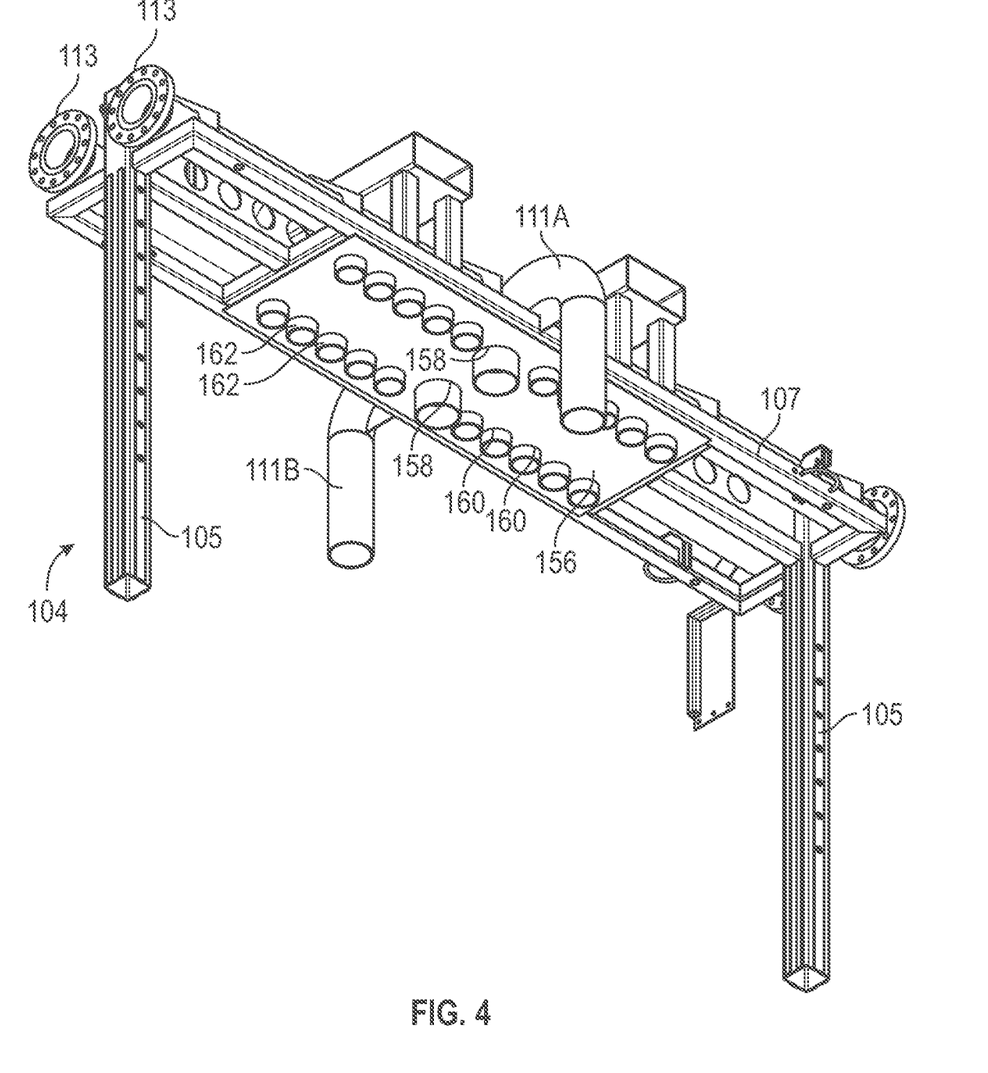
FIG. 4 illustrates a perspective view of a gantry support for the sand quantification system, according to an embodiment.

FIG. 4 illustrates a perspective view of the gantry support 104, including the central support 107 and a portion of the two uprights 105, according to an embodiment. Also shown in FIG. 4 are the vents 111A, 111B and the inlet conduits 113 that extend along the central support 107. A gantry plate 156 may be connected to the central support 107, e.g., below the inlet conduits 113. The gantry plate 156 may define two sets of holes 158, 160 therein, with the holes 158 being sized and positioned to receive inlet pipes 162 therethrough, and holes 160 being sized and positioned to receive the vents 111A, 111B therethrough. The inlet pipes 162 may intersect and be in communication with the inlet conduits 113, such that the inlet pipes 162 may receive slurry from the inlet conduits 113 and conduct the slurry into the box 106 (e.g., FIGS. 3A-3C). Further, the inlet pipes 162 may be received through the holes 152 in the top plate 150 (FIG. 3A). Accordingly, the holes 158 in the gantry plate 156 may be aligned with the holes 152 in the top plate 150, and the holes 160 in the gantry plate 156 may be aligned with the holes 154 in the top plate 150. The combination of the gantry plate 156 and the top plate 150 may maintain the inlet pipes 162, the inlet conduits 113, and the vents 111A, 111B in stable position.

Figure 5:
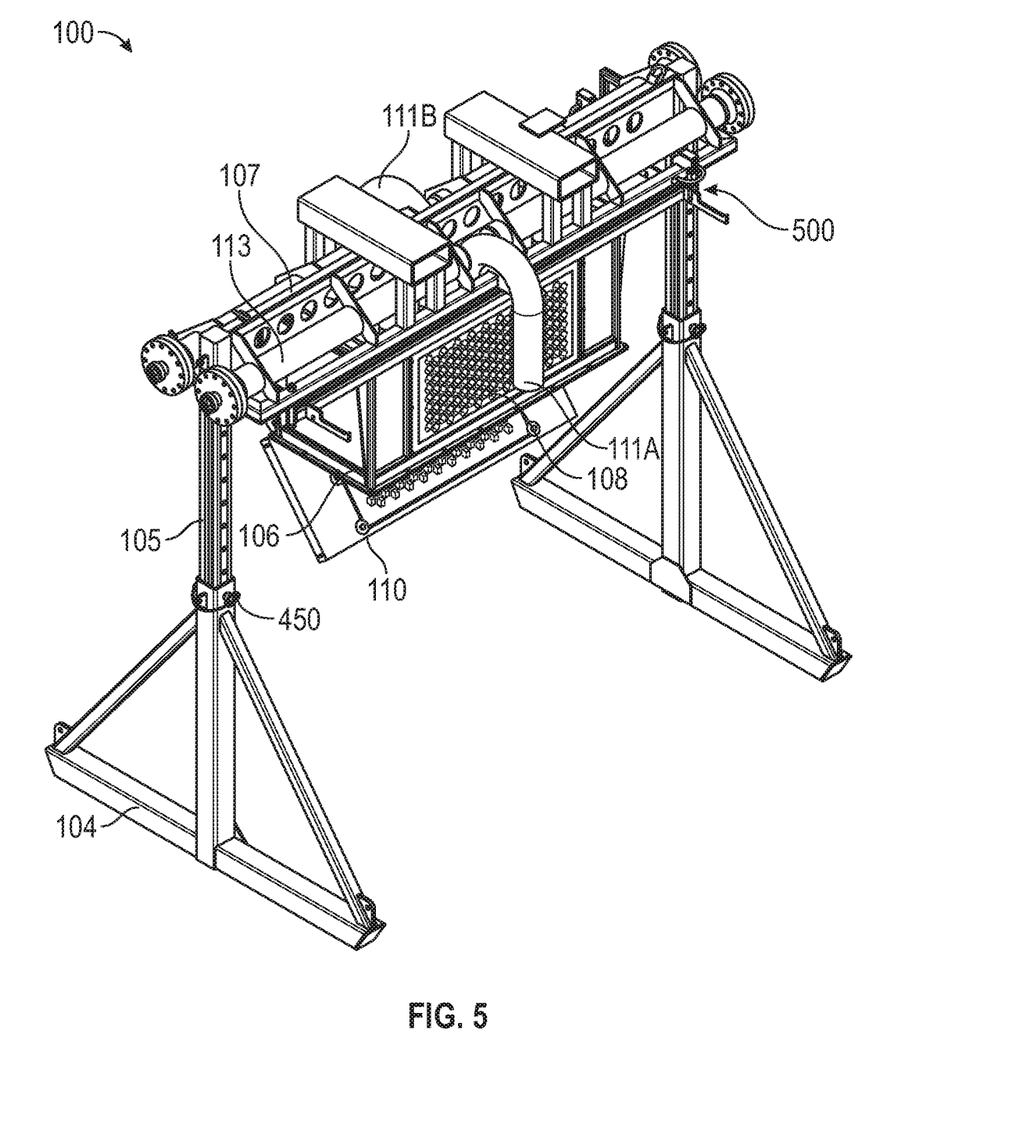
FIG. 5 illustrates a perspective view of the sand quantification system, according to an embodiment.

FIG. 5 illustrates a perspective view of the system 100, according to an embodiment. As shown, the uprights 105 of the support base 104 may be vertically adjustable, e.g., by telescoping. For example, a pin 450 may be received through the uprights 105, to align holes and maintain a height of the uprights 105. In addition, the vents 111A, 111B may be positioned proximal to the middle of the box 106, although this is merely an example, and may be positioned toward one side or the other of the box 106.

One or more load cells 500 may also be provided, which may be positioned at the connection between the box 106 and the central support 107. For example, the connection in which the one or more load cells 500 are positioned may be between the brackets 134A, 134B and the central support 107. The load cells 500 may be operable to measure a weight of the box 106, e.g., to compare the box 106 weight before and after sand delivery thereto. In some embodiments, three such load cells 500 may be employed, e.g., in a generally triangular pattern, with two on one side of the box 106, and one on the other. In other embodiments, two or four, or any other suitable number, of load cells 500 may be employed.

Figure 6:
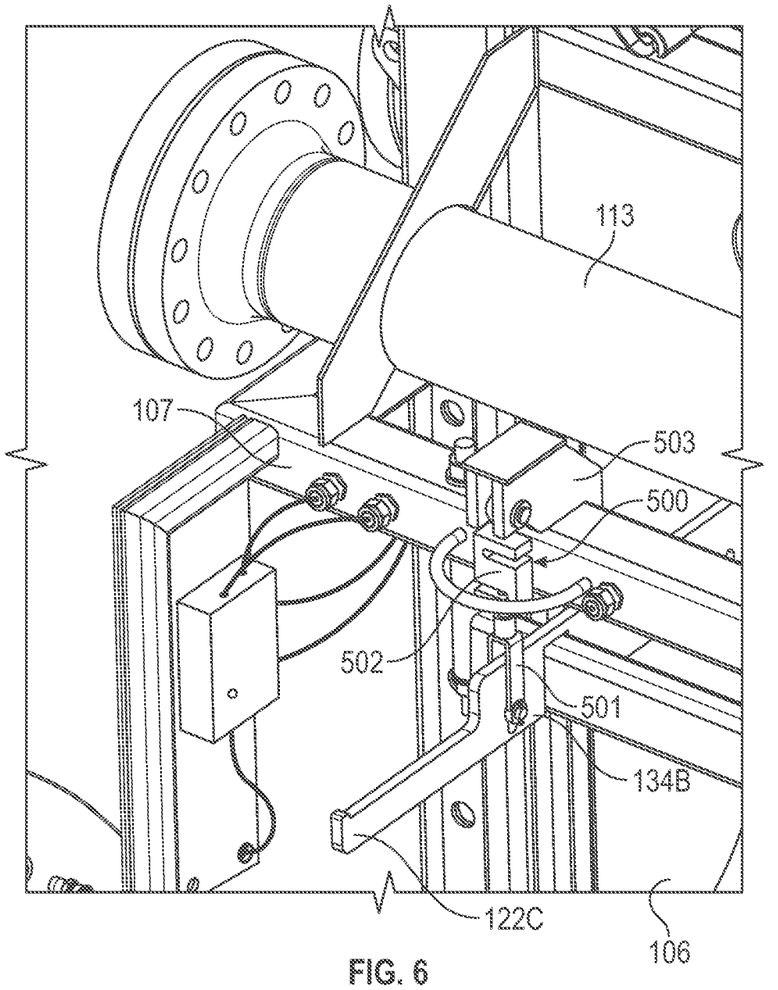
FIG. 6 illustrates an enlarged view of a load cell of the sand quantification system, according to an embodiment.

FIG. 6 illustrates an enlarged view of one of the load cells 500, according to an embodiment. The load cell 500 may include a strain gauge 502, which may connect to a bracket 501 that is connected to the box 106 (e.g., to the bracket 134B) and to a bracket 503 on or connected to the central support 107, so as to at least partially support the weight of the box 106 via the strain gauge 502. Further, the load cells 500 may include one or more bars, e.g., bolts, which may be engaged (e.g., tightened) to avoid shock loading of the strain gauge 502, e.g., during transport of the system 100. Similar load cells may be positioned at the corners of the box 106, in a triangular patter (e.g. two on the corners and one at the middle of the box 106), or in any other configuration.

Figure 7:
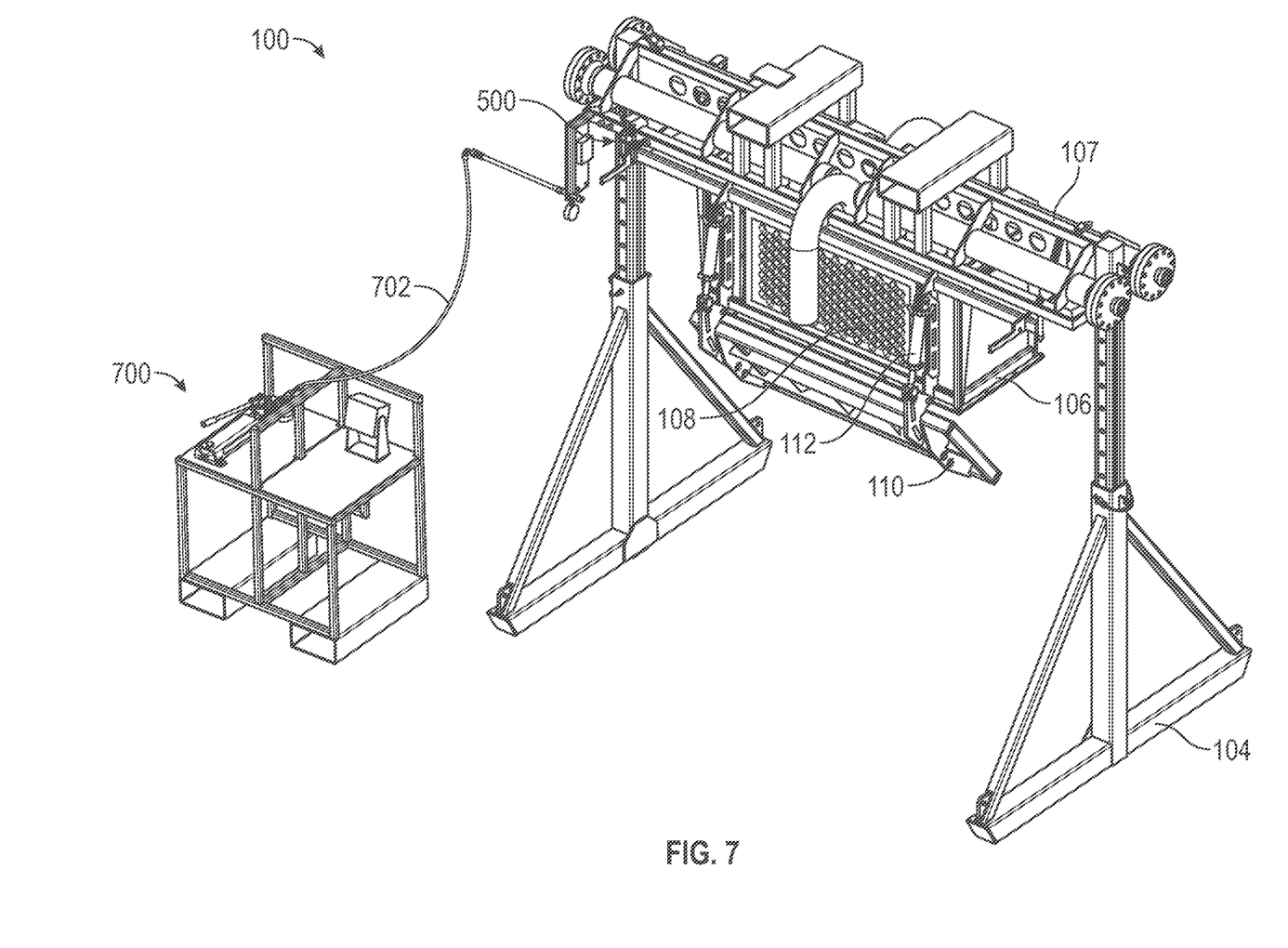
FIG. 7 illustrates a perspective view of the sand quantification system, including a remote control, according to an embodiment.

FIG. 7 illustrates a perspective view of the system 100 showing a remote terminal 700 connected to the box 106, according to an embodiment. The remote terminal 700 may be positioned adjacent to the box 106, as shown. In other embodiments, the remote terminal 700 may be separated from the box 106 but located at the same wellsite. In yet other embodiments, the remote terminal 700 may be located at another site and connected to the box 106 by one or more communications links.

For example, the remote terminal 700 may be electrically connected to the load cells 500. The remote terminal 700 may also be connected to the actuator 112 that opens/closes the bottom 110 of the box 106. The remote terminal 700 may be connected to the actuator 112 via a fluid line 702, which may conduct hydraulic fluid or pressurized air (e.g., as a pneumatic line) to the actuator 112. In other embodiments, the remote terminal 700 may be connected to the actuator 112 via an electrical line. Accordingly, the remote terminal 700 may be configured to capture data related to the weight of the box 106, and also to cause the actuator 112 to open the bottom 110 and release the contents of the box 106. The remote terminal 700 may include a processor that implements logic to control aspects of the system 100 and the remote terminal 700 may also communicate with another processor, which may implement logic to determine when to empty the box 106.

Figure 8:
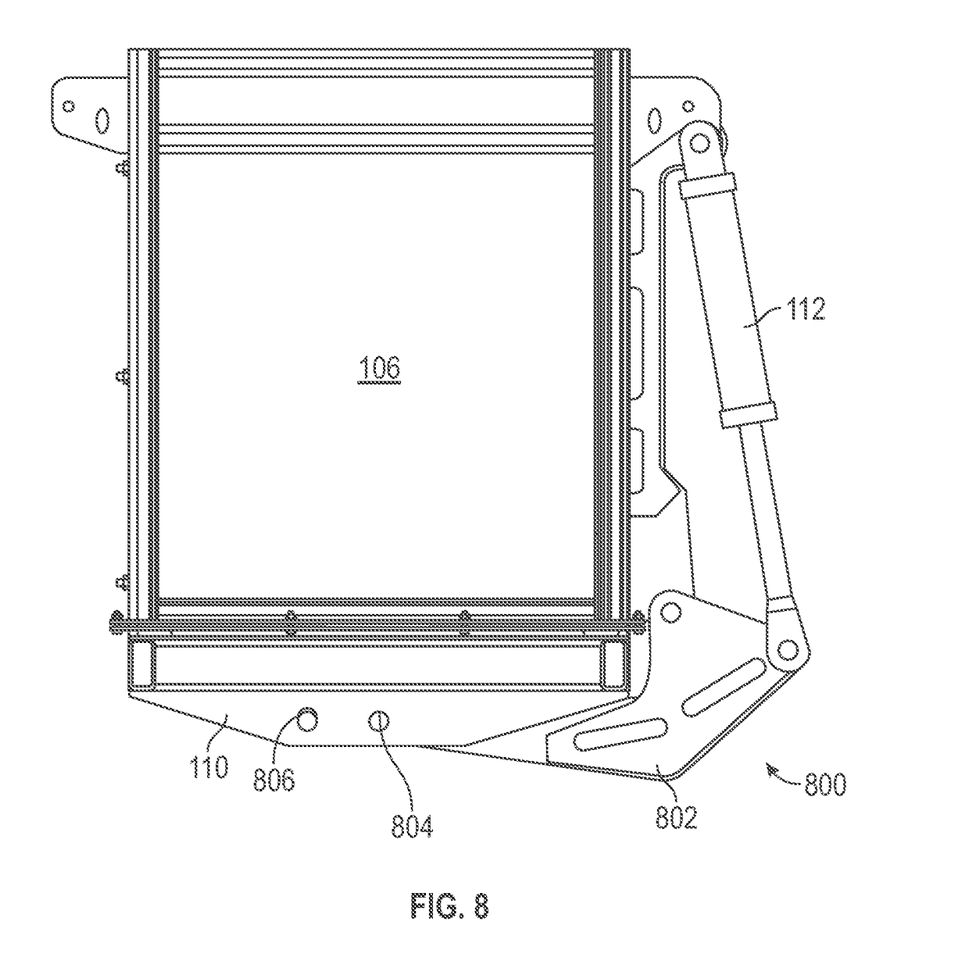
FIG. 8 illustrates a side view of the box, showing a linkage between an actuator of the box and an openable bottom of the box, according to an embodiment.

FIG. 8 illustrates a side view of the box 106, showing the actuator 112 attached to the bottom 110 via a linkage 800, according to an embodiment. The actuator 112 may be provided as one or more extensible hydraulic cylinders, as shown, but may also be provided by linear or rotary mechanisms. As shown, the linkage 800 may include a bracket 802 that is pivotally connected to the actuator 112 and to the box 106. The linkage 800 may be configured to convert extension of the actuator 112 into a closing pivoting action of the bottom 110, and contraction of the actuator 112 into an opening pivoting action of the bottom 110.

Further, the bracket 802 may be connected to the bottom 110 so as to provide a limited pivoting range of motion for the bottom 110 relative to the bracket 802. For example, the bracket 802 may include a pair of pins 804, 806. The first pin 804 may be proximal to the actuator 112 connection to the bracket 802 and between the second pin 806 and the actuator 112 connection to the bracket 802. Further, the first pin 804 may be received through aligned holes in the bracket 802 and the bottom 110, so as to allow for pivoting of the bottom 110 relative to the bracket 802 about the first pin 804. The second pin 806 may be received through a hole in either the bottom 110 or the bracket 802, and an elongated slot in the other of the bracket 802 or bottom 110. Thus, the second pin 806 may be movable through a sliding range of motion that corresponds to the size of the slot, but may prevent pivoting of the bottom 110 relative to the bracket 802 any farther.

Figure 9A:
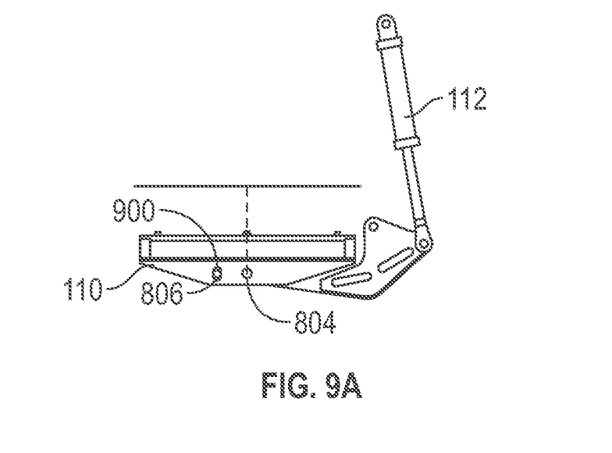
FIGS. 9A, 9B, and 9C illustrate a range of pivoting motion allowed by the linkage between the actuator and the bottom of the box, according to an embodiment.
Figure 9B:
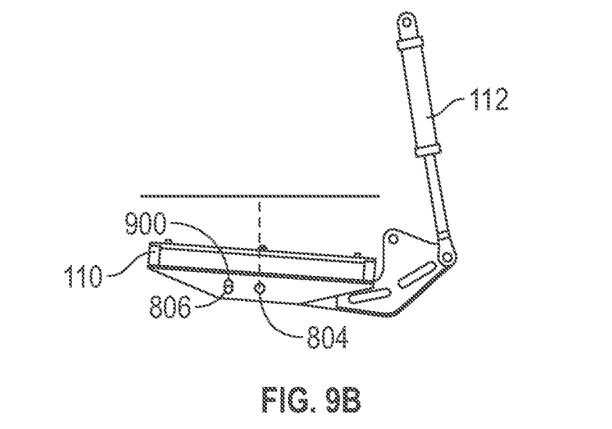
Figure 9C:
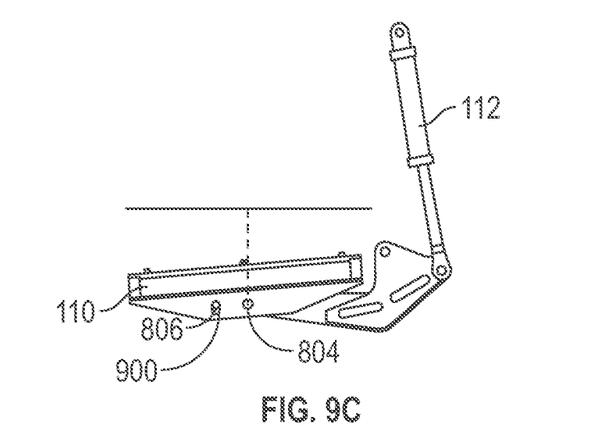

FIGS. 9A, 9B, and 9C illustrate the limited pivoting movement of the bottom 110 relative to the bracket 802, permitted by the pin 806 in a slot 900. Such limiting of the pivoting movement may prevent the bottom 110 from rotating through a wide arc and pointing downward when opened. Further, this range of motion allows for the bottom 110 to securely mate with a seal between the bottom of the sides of the box 106 and the bottom 110 when closing (e.g., a P-shaped rubber or VITON® gasket).

Figure 10:
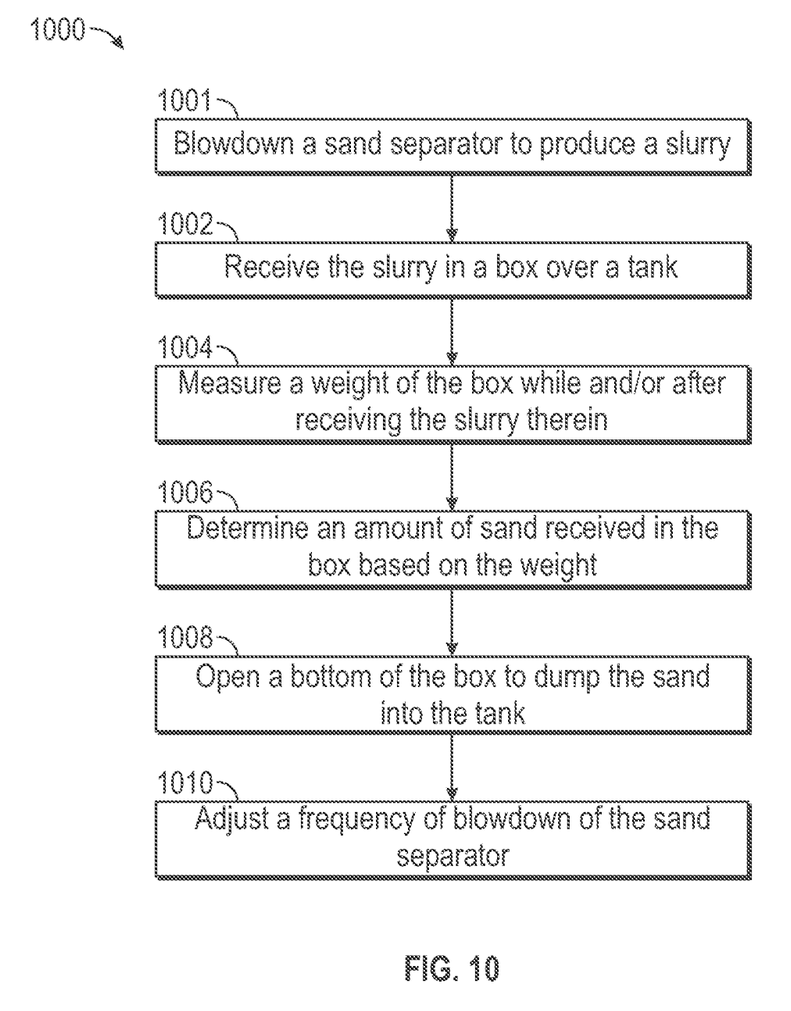
FIG. 10 illustrates a flowchart of a method for sand quantification, according to an embodiment.

FIG. 10 illustrates a method 1000 for measuring sand evacuated (blowndown) from a separator, according to an embodiment. The method 1000 may include blowing down a sand separator, which produces a slurry of solids (e.g., sand) and liquid, as at 1001. The method 1000 may also include receiving the slurry into a box suspended above an open-air tank, as at 1002. The method 1000 may include measuring a weight of the box as the slurry is received therein, as at 1004. The weight of the box 106 may initially increase by roughly the same weight as the slurry received therein, but the liquid components of the slurry may begin separating from the suspended sand, and filter out of the box though filter media thereof. Thus, the weight of the box may decrease as the liquid drains out, while increasing as the slurry is continued to be delivered thereto.

At some point, the slurry delivery may stop, and the weight of the box may continue reducing until reaching a steady state, of generally dry sand (and potentially other particulate matter). In response, the method 1000 may then include determining an amount of sand received into the box, as at 1006, e.g., by comparing the weight of the box before the slurry delivery to the weight thereafter.

In response to a trigger, the method 1000 may include opening a bottom of the box to dump the sand into the tank, as at 1008. The trigger may be a weight of the box, evidencing the box is at or nearing capacity. The trigger may be reaching steady state box weight after each one, two, or more blowdowns (which lead to slurry delivery). Various other triggers may be employed.

Using the information gathered about the weight of sand delivered, the operation of the sand separators may be tuned, e.g., the frequency at which the blowdown occurs may be adjusted, as at 1010. For example, blowing down the sand separator more frequently may interrupt separation service, cause wear on the valves, seals, etc., thereof. However, blowing down too infrequently risks overflowing the sand separator, reducing separation efficiency, etc. Furthermore, a well that produces sand in combination with liquid may not produce the same amount of sand at the same rate indefinitely, but rather may respond to downhole conditions, treatment operations, etc. Thus, the duration between blowdowns may be variable, and with knowledge of the sand produced by the prior blowdown, as determined using the method 1000, the frequency of blowdowns may be tuned to find an efficient blowdown frequency.

It will be appreciated that the method 1000 may employ the system 100 discussed above, and may thus provide an at least partially automated system for quantifying sand production and thus tuning blowdown frequency.

Figure 11:
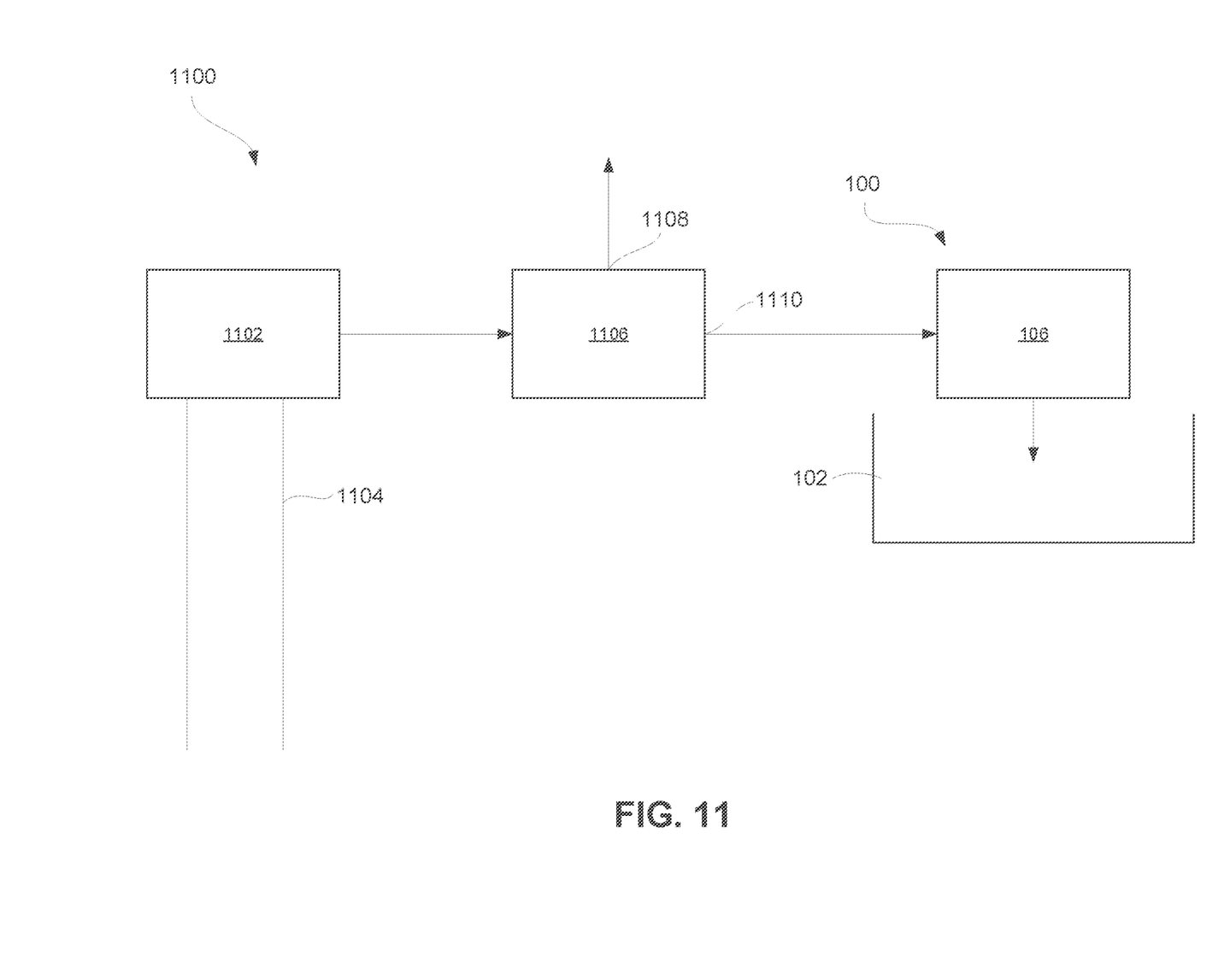
FIG. 11 illustrates a functional block diagram of a wellsite system, including the sand quantification system, according to an embodiment.

FIG. 11 illustrates a schematic view of a wellsite system 1100, according to an embodiment. FIG. 11 may provide a better understanding of one example of the context in which an embodiment of the sand quantification system 100 may be employed. The wellsite system 1100 may generally include a wellhead 1102 positioned at a top of a well 1104. The well 1104 may produce a slurry of solids (e.g., sand) and liquid therefrom. The slurry may be fed to a sand separator 1106 (e.g., via one or more intermediary components). The sand separator 1106 may separate some of the liquid from the sand, and may provide a liquid outlet 1108 and a slurry outlet 1110. The remaining liquid and the sand may be fed to the box 106 via the slurry outlet 1110. As mentioned above, the box 106 may receive and dehydrate (allowing the liquid to drain out of the slurry), and may permit measurements/calculations of the amount of sand received from the sand separator 1106. The box 106 may be periodically emptied into the tank 102, as shown.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
   a box configured to be positioned over a tank, wherein the box is in fluid communication with an inlet conduit configured to receive a slurry comprising solids and liquids, and wherein the box comprises:
      an openable bottom configured such that, when the openable bottom is open, contents within the box are dumped into the tank; and
      a filter configured to allow the liquids in the slurry to drain out of the box without opening the openable bottom;
   a load cell configured to measure a weight of the box and the contents therein without measuring a weight of the tank after the filter allows a substantial portion of the liquids in the slurry to drain out of the box, wherein the contents include the solids in the slurry; and
   a top plate coupled to the box, wherein the top plate defines a first plurality of holes to receive inlet pipes therethrough, wherein the first plurality of holes are sized so as to not seal with the inlet pipes, wherein the top plate defines a second plurality of holes to receive vents, and wherein the second plurality of holes are sized so as to not seal with the vents.

2. The system of claim 1, wherein the box comprises an actuator coupled to the openable bottom and configured to open and close the openable bottom by moving the openable bottom relative to a side of the box.

3. The system of claim 2, wherein the box further comprises a linkage that couples the actuator to the openable bottom, and wherein the linkage permits for a range of pivotal motion between the openable bottom and the actuator.

4. The system of claim 3, wherein the linkage comprises a first pin and a second pin, the first pin received through aligned holes in the linkage and the openable bottom, and the second pin received through a hole in either the linkage or in the openable bottom and a slot in either the linkage or in the openable bottom, wherein the second pin is movable in the slot so as to permit pivotal motion of the openable bottom relative to the linkage.

5. The system of claim 1, further comprising a base including an upright and a central support, wherein the box is suspended from the central support, and wherein the load cell connects the box to the central support.

6. The system of claim 5, further comprising one or more inlet conduits coupled to the central support and communicating with an interior of the box.

7. The system of claim 6, further comprising a gantry plate coupled to the central support and configured to receive inlet pipes therethrough, the inlet pipes being in communication with the one or more inlet conduits.

8. The system of claim 1, further comprising the vents extending from within the box to an exterior of the box.

9. The system of claim 1, wherein the box comprises one or more baffles therein configured to impede the slurry received into the box, wherein the contents of the box comprise the slurry, and wherein the box is configured to permit the liquids in the slurry to drain from the solids in the slurry.

10. The system of claim 1, wherein the box comprises one or more calibration hangers configured to accept calibration weights thereon, for calibrating the load cell.

11. The system of claim 10, wherein the one or more calibration hangers extend laterally from a remainder of the box to permit access thereto from a side of the tank.

12. The system of claim 1, further comprising:
a gantry support comprising uprights and a central support extending between the uprights and across the tank; and
an inlet conduit coupled to the gantry support and configured to receive the slurry,
wherein the box is suspended from the central support, the box being in fluid communication with the inlet conduit,
wherein the box comprises the filter and an actuator, the openable bottom being openable by operation of the actuator, and
where the load cell is coupled to the box and the central support.

13. The system of claim 12, wherein the box comprises the vents are J-shaped and extending from within the box to outside of the box.

14. The system of claim 12, wherein the box comprises a linkage that connects the actuator to the bottom, wherein the linkage is configured to permit the bottom to pivot with respect to the actuator and to pivot with respect to the linkage.

15. The system of claim 12, wherein the box comprises one or more baffles therein that are configured to impede a flow of the slurry received into the box from the inlet conduit from impinging directly against the bottom of the box, and wherein the box comprises one or more calibration hangers configured to receive one or more weights to calibrate the load cell.

16. The system of claim 1, wherein the box is configured to receive the slurry from a separator, and wherein the solids comprise sand.

17. The system of claim 1, wherein the box further comprises an actuator coupled to the openable bottom via a bracket, wherein the bracket includes a first pin and a second pin, wherein the first pin is positioned between the actuator and the second pin, wherein the first pin is received through aligned holes in the bracket and the openable bottom so as to allow for pivoting of the openable bottom relative to the bracket about the first pin, and wherein the second pin is received through a hole in one of the openable bottom or the bracket and a slot in the other of the openable bottom or the bracket, and wherein the second pin is movable through a sliding range of motion that corresponds to a size of the slot.

18. The system of claim 1, wherein the box further comprises a hanger assembly including a plurality of hangers that are configured to have weights suspended therefrom to calibrate the load cell, and wherein the hanger assembly comprises:
first and second horizontal cross-members that are parallel to the filter, wherein the first and second horizontal cross-members each includes a pair of the hangers at opposing ends thereof;
first and second horizontal brackets that are connected to the first and horizontal second cross-members, wherein the first and second horizontal brackets are perpendicular to the first and second horizontal cross-members; and
first and second vertical brackets that are connected to and positioned between the box and the first and second horizontal cross-members, wherein the first and second vertical brackets are perpendicular to the first and second horizontal cross-members and to the first and second horizontal brackets.

19. A system, comprising:
an open-air tank;
a gantry support comprising uprights and a central support extending between the uprights and across the open-air tank;
an inlet conduit coupled to the gantry support and configured to receive a slurry comprising solids and liquids;
a box suspended vertically below and from the central support by a connection, the box being in fluid communication with the inlet conduit, wherein the box comprises one or more filters and a bottom that is openeable, wherein the one or more filters are configured to allow the liquids in the slurry to drain out of the box without opening the bottom;
a load cell coupled to the connection between the box and the central support, the load cell being configured to measure a weight of contents of the box suspended over the open-air tank from the central support after the one or more filters allow a substantial portion of the liquids in the slurry to drain out of the box, wherein the contents include the solids in the slurry; and
a top plate coupled to the box, wherein the top plate defines a first plurality of holes to receive inlet pipes therethrough, wherein the first plurality of holes are sized so as to not seal with the inlet pipes, wherein the top plate defines a second plurality of holes to receive vents, and wherein the second plurality of holes are sized so as to not seal with the vents.

20. The system of claim 19, wherein the box comprises the vents are J-shaped and extending from within the box to outside of the box.

21. The system of claim 19, wherein the box comprises a linkage that connects the actuator to the bottom, wherein the linkage is configured to permit the bottom to pivot with respect to the actuator and to pivot with respect to the linkage.

22. The system of claim 19, wherein the box comprises one or more baffles therein that are configured to impede a flow of the slurry received into the box from the inlet conduit from impinging directly against the bottom of the box, and wherein the box comprises one or more calibration hangers configured to receive one or more weights to calibrate the load cell.

23. A system, comprising:
a box configured to be positioned over a tank, wherein the box is in fluid communication with an inlet conduit configured to receive a slurry comprising solids and liquids, and wherein the box comprises:
an openable bottom configured such that, when the bottom is open, contents within the box are dumped into the tank;
a hanger assembly including a plurality of hangers that are configured to have weights suspended therefrom to calibrate a load cell, wherein the hanger assembly comprises:
first and second horizontal cross-members that are parallel to a filter, wherein the first and second horizontal cross-members each includes a pair of the hangers at opposing ends thereof;
first and second horizontal brackets that are connected to the first and horizontal second cross-members, wherein the first and second horizontal brackets are perpendicular to the first and second horizontal cross-members; and
first and second vertical brackets that are connected to and positioned between the box and the first and second horizontal cross-members, wherein the first and second vertical brackets are perpendicular to the first and second horizontal cross-members and to the first and second horizontal brackets;
the load cell configured to measure a weight of the box and the contents therein without measuring a weight of the tank after a substantial portion of the liquids in the slurry drain out of the box, wherein the contents include the solids in the slurry; and
a base including an upright and a central support, wherein the box is suspended from the central support, and wherein the load cell connects the box to the central support.

24. The sand quantification system of claim 23, wherein the contents comprise sand.

25. The system of claim 23, further comprising a top plate coupled to the box, wherein the top plate defines a first plurality of holes to receive inlet pipes therethrough, wherein the first plurality of holes are sized so as to not seal with the inlet pipes, wherein the top plate defines a second plurality of holes to receive vents, and wherein the second plurality of holes are sized so as to not seal with the vents.

* * * * *